(12) United States Patent
Jones

(10) Patent No.: US 12,029,272 B2
(45) Date of Patent: Jul. 9, 2024

(54) MILITARY OR COMBAT OR OTHER HELMET SMART INTELLIGENT VISOR

(71) Applicant: JJ1 Holdings Pty Ltd, Queensland (AU)

(72) Inventor: Jeanette Mary Jones, Blacks Beach (AU)

(73) Assignee: JJ1 Holdings Pty Ltd, Queensland (AU)

( * ) Notice: Subject to any disclaimer, the term of this patent is extended or adjusted under 35 U.S.C. 154(b) by 257 days.

(21) Appl. No.: 17/629,247

(22) PCT Filed: Jul. 16, 2020

(86) PCT No.: PCT/AU2020/000070
§ 371 (c)(1),
(2) Date: Jan. 21, 2022

(87) PCT Pub. No.: WO2021/011989
PCT Pub. Date: Jan. 28, 2021

(65) Prior Publication Data
US 2022/0248798 A1    Aug. 11, 2022

(30) Foreign Application Priority Data
Jul. 22, 2019  (AU) .............................. 2019902584

(51) Int. Cl.
*A42B 3/22* (2006.01)
*A42B 3/30* (2006.01)
*G02B 27/01* (2006.01)

(52) U.S. Cl.
CPC ............... *A42B 3/228* (2013.01); *A42B 3/30* (2013.01); *G02B 27/0172* (2013.01); *G02B 27/0176* (2013.01)

(58) Field of Classification Search
CPC .................................................. G02B 27/0172
See application file for complete search history.

(56) References Cited

U.S. PATENT DOCUMENTS

| 8,475,367 B1 * | 7/2013 | Yuen ..................... G16H 50/30 |
| | | 177/4 |
| 2009/0018488 A1 | 1/2009 | Davis |
| 2016/0109709 A1 | 4/2016 | Osterhout |
| 2017/0052000 A1 * | 2/2017 | White ................... A42B 3/063 |

(Continued)

FOREIGN PATENT DOCUMENTS

WO    2017040724 A1    3/2017

OTHER PUBLICATIONS

International Search Report, mailed Oct. 30, 2020, by the ISA/AU, re International Application No. PCT/AU2020/000070.
(Continued)

*Primary Examiner* — Gustavo Polo

(57) ABSTRACT

A visor for a military, combat or specialist services helmet with a heads up display function wherein positions of all wearers during operations can be visualized in real time. The invention is directed to live streaming of troop and specialist service personnel positions which are digitized and represented as two dimensional moving icons projected on the heads up display. Its objective is particularly directed to the purposes of rapid location and efficient search and rescue of injured and/or isolated soldiers or personnel.

21 Claims, 3 Drawing Sheets

(56) References Cited

U.S. PATENT DOCUMENTS

2018/0190029 A1     7/2018  Stein et al.
2018/0348529 A1*   12/2018  Blum .................... G06T 19/006
2020/0176569 A1*    6/2020  Singh ................ H01L 29/66977

OTHER PUBLICATIONS

Written Opinion, mailed Oct. 30, 2020, by the ISA/AU, re International Application No. PCT/AU2020/000070.

* cited by examiner

MILITARY OR COMBAT OR OTHER HELMET SMART INTELLIGENT VISOR

FIELD OF THE INVENTION

This invention relates to military or specialized civilian service equipment. In a military context, it concerns a helmet or visor for a military or combat helmet with a heads up display wherein troop positions during operational maneuvers can be visualized by every combatant in real time in a secure communications network. More particularly, the invention is directed to live streaming of changes to the positions of personnel and equipment which are artificially or virtually represented as two dimensional moving digitized icons or symbols which can be projected on the visor. It is particularly directed to the purposes of rapid and efficient search and rescue and to coordinate immediate or pre evacuation medical attention and anticipated treatment by first responders. To protect sensitive and personal information, the invention anticipates the implementation of current developments in cyber security measures such as quantum technology enabled encryption in the processing, transmission and reception of data and information within the communications network.

In a civilian application, the invention may be used with helmets in the policing, fire fighting, construction and mining industries wherein the live streaming of changes to the positions of personnel, vehicles and mining equipment can be artificially or virtually represented as two dimensional moving digitized icons or symbols which can be projected on the visor. In the case of an isolated or injured worker, rapid and efficient rescue and coordination of medical attention as in the military situation can be likewise achieved.

BACKGROUND OF THE INVENTION

The use of helmet mounted heads up display (HMD) are known e.g. CN202676029U (police helmet) and DE202018106619U1 (combat helmet). In both these prior art examples, multiple aspects of information can be communicated to the wearers of the helmets.

While the prior art helmets include the ability to send video images of surroundings to a central computer, there is no computer conversion of those images into a moving symbol or icon format to show real time changes of troop, personnel or equipment positions. The processing of data from a video image taken by a camera device or imaging means (CN202676029U) or digital camera (DE202018106619U1) involves a significant added cost, complexity and actual weight to the helmet.

It is undisputed and recent studies have indicated that the majority of deaths on the battlefield are a result of wounded combatants or soldiers not receiving immediate medical attention. This is compounded by the fact that medics often have difficulty in actually locating injured personnel especially in dense vegetation or unfriendly or geographically challenging terrain.

It is recognized that apart from direct engagement, military personnel are also killed or seriously injured by walking over landmines. Currently around 78 countries include areas substantially contaminated with landmines. As a consequence, approximately between 15,000 to 20,000 people are killed every year while countless more are permanently maimed. Approximately a fifth of all landmine casualties are military personnel. In the abovementioned 78-odd countries, it is estimated 110 million active landmines remain still buried in the ground.

While ideally, an injured combatant is attended to by a medic or fellow combatant in the immediate vicinity, in most cases, the injured soldier is air lifted to a remotely located military hospital without any intervening medical attention. The crucial factor in all these situations is undeniably the time passing between when the injury is incurred and the commencement of actual life saving treatment.

In recent studies, it has been shown that the leading cause of fatalities between 2001 and 2011 of United States personnel stationed in Iraq and Afghanistan has been brain injury. Brain injury deaths during this period numbered over 900 lives; chest or heart wound fatalities numbered over 300 lives; high spinal chord fatalities at just over 200 lives, and deaths due to open pelvic wounds at around 100 deaths.

Any delay in administering immediate medical assistance is thus particularly relevant in the successful treatment of brain injuries. This is well established in the case of strokes or transient ischaemic episodes and more recently, sporting concussive injuries leading to chronic traumatic encephalitis. In a more local context, it has been estimated that between a quarter and a third of Australian Defence Force personnel have experienced at least one Mild traumatic Brain Injury (MTBI) in their lifetime.

Furthermore, the ability to anticipate the type of medical treatment required prior to the actual rescue and evacuation of the injured soldier, has the immense benefit of simply saving time and ultimately, lives. This is naturally also often dependent on the medical expertise and knowledge of the first responder. There is thus an inestimable benefit to be able to expertly asses, the physical condition of an injured soldier in real time by telemetric or other means. This is especially where the soldier may be unconscious or unable to verbally communicate directly with a command post or fellow combatants.

In the military context, cyber security of information and data both in peacetime and especially in warfare is of the utmost importance. The latest security measures would obviously be utilized and is anticipated would include quantum technology computer implemented cyber security encryption to eliminate or prevent cyber-hacking or breaches of information or data streamed to and from the command facility to the battle field.

It is therefore an object of the present invention to seek to eliminate or ameliorate the problem(s) hereinbefore described by providing a visor for a military or combat helmet on which troop, worker and equipment movements and other information can be visually represented without the need of a cumbersome digital camera device or imaging means.

SUMMARY OF THE INVENTION

In one aspect, the invention resides in an intelligent full-face, heads up display helmet visor, the visor comprising:
- a surface adapted for a visual heads up display function;
- a projector for the heads up display function;
- a microprocessor to control the projector and information projected on the surface;
- the microprocessor further adapted to transmit and receive positional information to and from a command computer and other microprocessors in a communications network;
- wherein in operation,
- positions of personnel wearing helmets with said visors and any equipment associated with the other microprocessors are transmitted to the command computer, and wherein changes to the positions of personnel and the equipment within the communications network are virtually represented as digitized two dimensional moving icons or symbols which are projected onto the surface without interfering with the field of vision viewed through the visor.

Preferably, the visor has attachment means including lugs or bosses or fitment points specially configured to enable the visor to be retrofitted to current prior art helmets.

Preferably, the projector is a laser scanning projector which projects the icons or symbols on the surface in a plain, multiple colors or flashing mode.

Preferably, the microprocessor has a smart or intelligent biometric identification capability including recognition of iris or retinal scanning or voice recognition to facilitate secure or password access to the command computer.

In a preferred embodiment, the visor can include an in built microphone in connection with the microprocessor to respond to voice activated instructions from the combatant for example voice activated instructions for the visor to enter a night vision or an infra-red functional display mode.

Preferably, the visor is fully retractable into the shell of the visor.

In a preferred embodiment, the heads up display is projected on substantially the whole area of the visor.

Alternatively, the heads up display is projected on an eye patch portion of the visor in front of one of a wearer's eyes.

The microprocessor can receive information from the command computer which has processed data from one or more biometric sensors such as galvanic skin response and heart rate detectors. Other biometric sensors can include an air flow meter adapted to detect respiratory rate.

Preferably, the command computer and all the microprocessors utilize quantum technology computer implemented cyber security encryption to eliminate or prevent cyber-hacking or breaches of information or data streamed to and from the visor.

The command computer which can be in a stationary location or in an armored vehicle or is airborne will monitor troop positions during an operational maneuver. The positional information is then transmitted to the microprocessor to be visually displayed on the heads up display of every combatant's visor.

Preferably, the command computer continually updates troop positions in real time during an operational maneuver which is then transmitted in real time and is visually displayed in real time on every combatant's visor.

Preferably, the microprocessor receives information from the command computer of data from biometric sensors monitoring the physical condition of combatants including galvanic skin response, heart rate and respiratory rate.

In a preferred application, the physical condition of an injured or isolated combatant can be displayed to every combatant in the immediate vicinity of the injured or isolated combatant. This allows for appropriate medical treatment to be rapidly administered by the nearest combatant or first responder.

Where the command computer is used to coordinate the rescue and evacuation of an injured or isolated combatant, the biometric information of the injured or isolated combatant can be used to determine the type of medical attention required prior to the actual rescue and evacuation itself. This has the immense benefit of saving time and ultimately, the life of the injured or isolated combatant.

Preferably, the microprocessor has a communications module to connect with other microprocessors of other visors which uses a Bluetooth wireless or equivalent communication protocol depending on the location or applicable environment to comprise the communications network.

In another example, landmines located within a predetermined radius can be displayed on the heads up display wherein the microprocessor is provided with the information by the command computer and representations of the landmines are displayed on the visor.

Preferably, the functions of the visor are voice activated to free up the combatant's hands and can include a voice recognition function to establish that a combatant is not under any physical or other duress.

The visor can also have a night vision and/or infra red detection where there are poor visibility conditions depending on the combat situation.

In a preferred example, the visor can provide access for, or integration of breathing apparatus, such as in a hazardous chemical environment or warfare application.

Preferably the visor includes a smart or intelligent functional capability in response to voice activated instructions from the combatant.

Where personnel have different roles, there is preferably ability for them to select the content and category of information to be accessed and displayed through the visor. This is exemplified where a medic can select only the biometric information of an injured combatant so as not to be distracted by other troop or strategic operational information. Likewise, soldiers engaged in combat can select to view the troop or strategic operational information without the distraction of any biometric data.

As previously discussed, the microprocessor and the command computer utilize quantum technology cyber security encryption to eliminate or prevent cyber-hacking or breaches of information or data within the communications network.

In another aspect, the invention resides in a military, combat or other helmet associated with or incorporating an intelligent full-face, heads up display visor as herein described.

BRIEF DESCRIPTION OF THE DRAWINGS

In order that the present invention is understood reference is made to the accompanying drawings wherein.

DETAILED DESCRIPTION OF THE EMBODIMENTS

As previously mentioned, while the foregoing embodiment relates to a military or combat example, the same considerations apply in the case of civilian application wherein the invention may be used with helmets in the policing, fire fighting, construction and mining industries.

Figure 1:
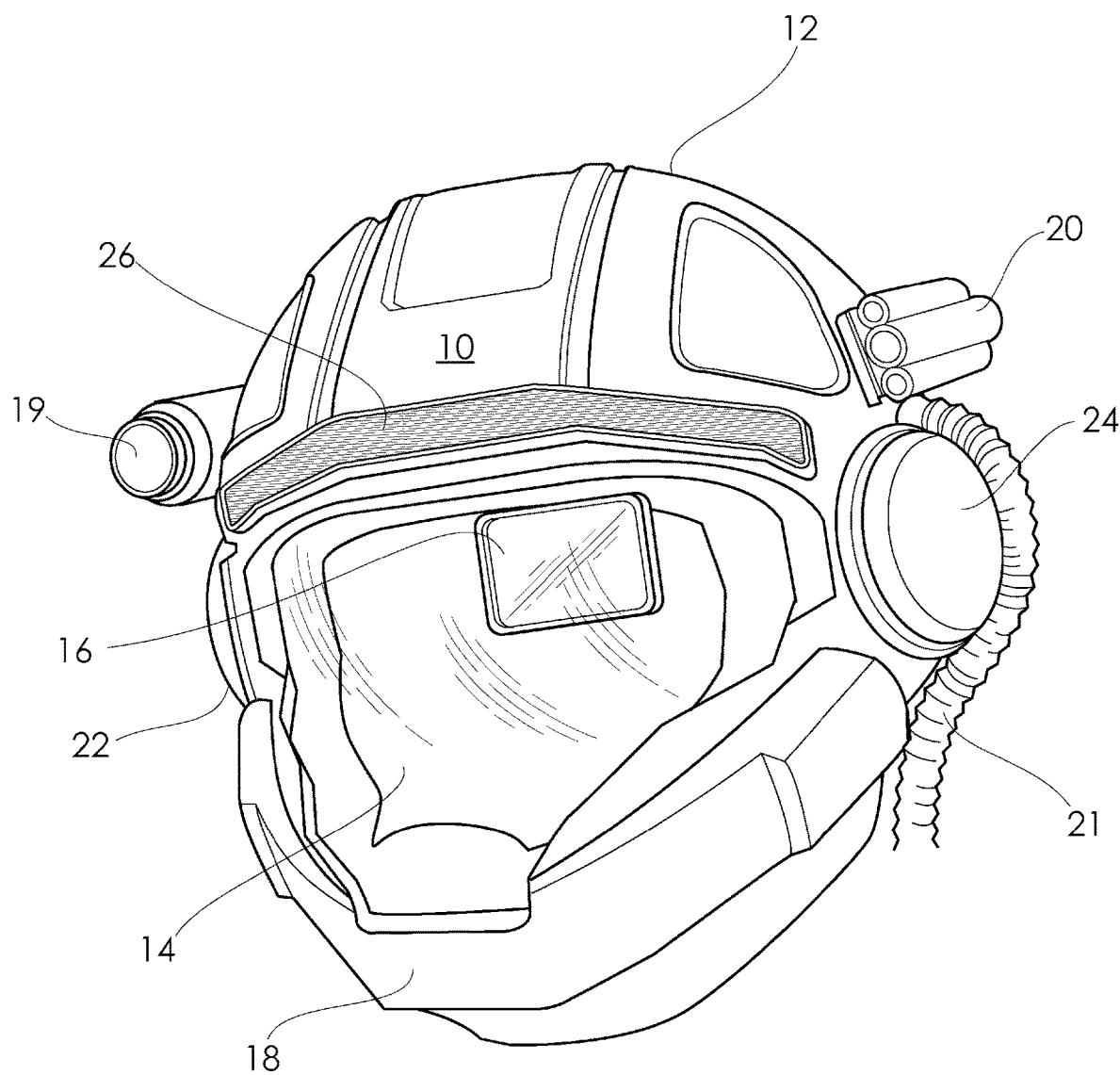
FIG. 1 is a drawing of a preferred visor of the invention.

Referring now to FIG. 1, the military or combat helmet 10 comprises an anti-ballistic head protective shell 12. This is preferably of a highly projectile resistant composite material such as Kevlar. The see through visor 14 includes a heads up display function 16. The helmet 10 has a removable chin guard 18. Not shown, but incorporated in the visor is a microprocessor and projector which projects a two dimensional image on the visor 14. Global positioning system (GPS) tracks the position and movement of the visor through the microprocessor worn by a combatant or soldier. The visor may house one or more biometric sensors specially adapted to detect physiological parameters such as heart and/or respiratory rate. The visor incorporates a microprocessor (not shown) to control the projection of the soldier's position and physiological data which can be visualized on the heads up display. The wireless protocol microprocessor is adapted to send the position and any biometric information to a command computer or microprocessors of other combatant's visors (not shown). As previously described, the command computer and the microprocessors preferably utilize quantum technology computer implemented cyber security encryption to eliminate or prevent cyber-hacking or breaches of information or data streamed to and from the visor.

All troop positions during operational maneuvers can be visually displayed to every combatant including the location and physical condition of any injured or isolated combatant.

The visor can also have a night vision and/or infra red detection 19 to address poor visibility conditions depending on the combat situation. Likewise, there can be access provided for, or integration of breathing apparatus shown by tube 21 in a chemical warfare application.

Figure 2:
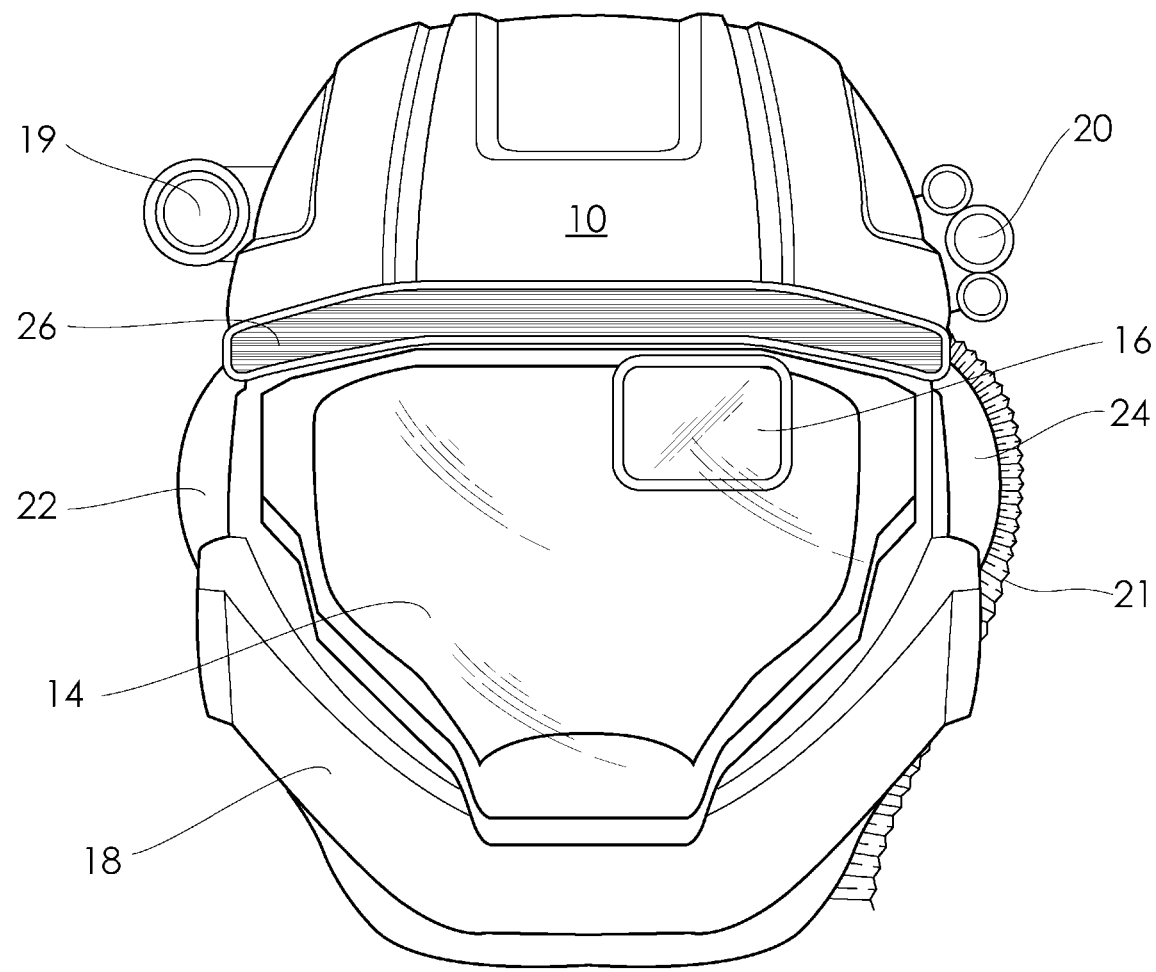
FIG. 2 is a drawing of the visor of FIG. 1 with an eye patch heads up display.

FIG. 2 shows the visor of FIG. 1 with an eye patch heads up display 16. Visual information can be processed by a soldier using one eye leaving the other eye unrestricted to scan the environment. There is an information receiver 20 at the front of the visor which is associated with landmine detection apparatus (not shown) which sends an immediate audio warning alarm to speakers 22, 24 in the visor. The visor will preferably have an audio speaker over each ear whereby the soldier can also determine from a stereophonic difference and volume of the sound signals, a general direction and proximity of a landmine or unexploded ordnance detected. The GPR radar suitably transported by a remotely controlled drone or vehicle is high frequency radar that emits radio waves which are reflected at discontinuities in permittivity and an antenna of the visor will pick up the reflected or return signal. The signal can be analyzed to determine the shapes and locations of the landmines. Discontinuities in permittivity occur between materials with different dielectric constants such as distinguishing a landmine from surrounding rocks and soil. Unlike metal detectors, GPR devices can detect non-metallic mine casings. Preferably, the visor will issue warnings when a landmine is approximately 10 meters from where a soldier is walking or running. The soldier can communicate with his superiors and/or command as to how to respond and request assistance. The heads up display will pinpoint exactly where the soldier is and the location of the landmine or unexploded ordnance will be sent to the command post.

Figure 3:
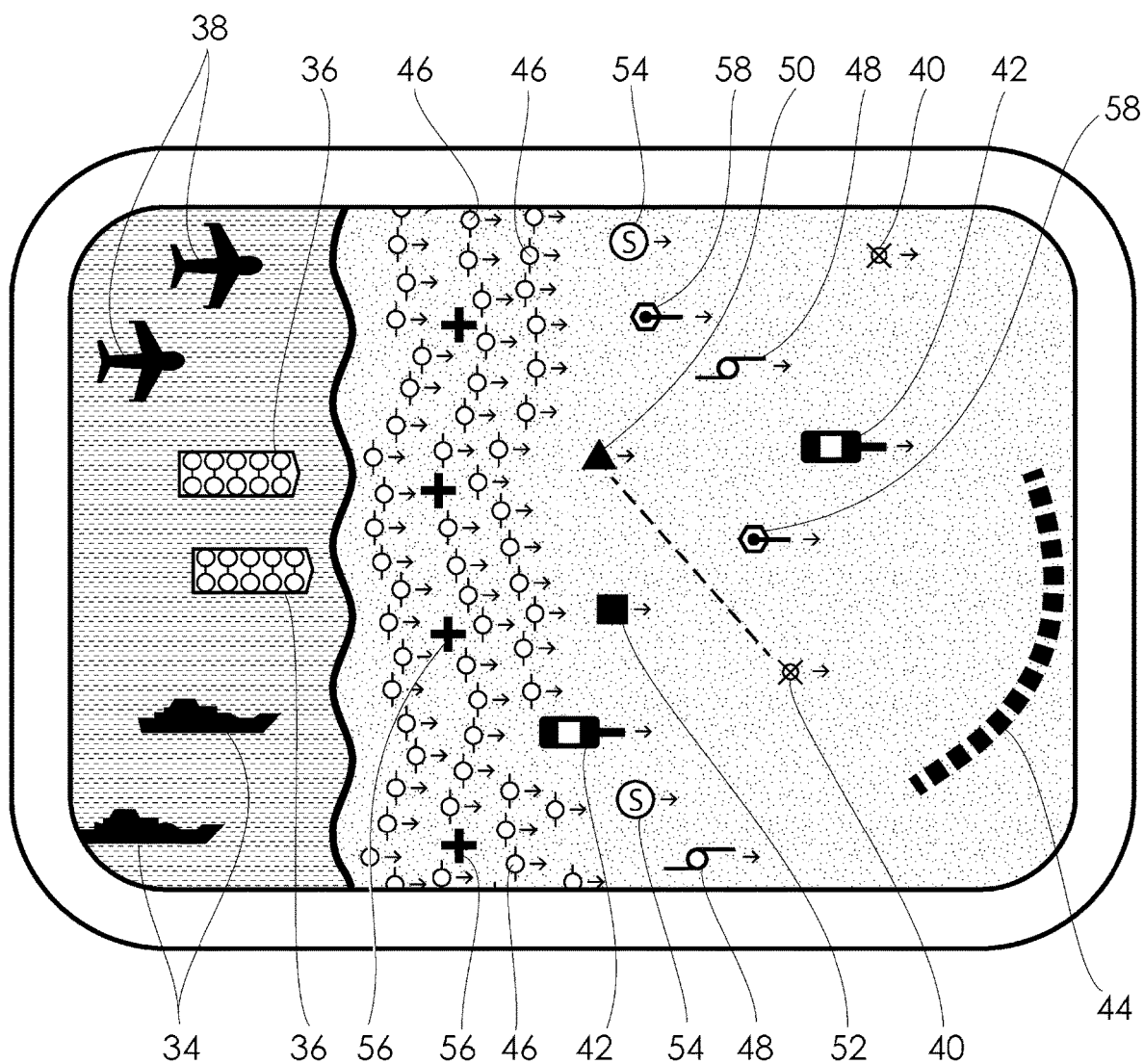
FIG. 3 is a visual rendering of the type of information displayed.

FIG. 3 is an example of a digitized screen projection 30 viewed on the heads up display of the visor 14. The artificially or virtually digitized two dimensional moving icons are projected and continuously updated in real time, to show the movements of various personnel, vehicles and equipment which are represented as icons or symbols. Vehicles include warships 34, barges, 36 aircraft 38, drone 40, and tanks 42 all moving towards the battlefront objective 44. Key personnel include infantry 46, snipers 48, officer in charge 50, second in command 52, signal ops 54 and medics 56. Equipment such as heavy artillery, for example, a gun 58, is displayed in as a two dimensional moving icon.

As previously mentioned, the visor preferably includes a smart or intelligent functional capability which responds to voice activated instructions from the combatant. Where personnel have different or specific roles, there is preferably ability for them to select the content and category of information to be accessed and displayed through the visor. This is exemplified where a medic will select only the biometric information of an injured combatant so as not to be distracted by other troop or strategic operational information. Likewise, soldiers engaged in combat can select to view the troop or strategic operational information without the distraction of any biometric data. The use of spoken voice activated pass words can also provide a layer of security wherein a medic will be the only personnel to access medical and/or biometric data of a combatant.

The soldier will have a heads-up display on the visor which preferably also shows battlefield maps indicating the locations of all personnel on the battlefield and their direction of travel at any given time.

All personnel may have software driven functions that they can select by recognised and identified voice activation. Secure access to the category of information visualised will depend on their core role or duty of individuals. For example a medic will have specific access to information relative to the location and vital signs of an injured soldier with warnings of any deterioration of the soldier's condition being sent as an alarm to the medic's visor. The medic who is the closest to the injured soldier will be provided with the location and vital signs of that soldier. The smart capability of the visor will also work out which medic is closest to the injured soldier.

The medic can command access to a Doctor via his head-up display to assist in the treatment of a critically injured soldier. Immediate evacuation of the injured soldier can then be requested once the soldier's condition is considered to have stabilised.

In another application an Officer in Command (OIC) can have streamed live video feed from a drone displayed on his visor which can cover the location and coordinates of the enemy. Access through software control will only be enabled for the OIC or Second in Command (2IC) through a secure password protocol.

As previously mentioned, in all communications, whether drone or vehicle or otherwise implemented, the command computer and the microprocessors preferably utilize quantum technology computer cyber security encryption to eliminate or prevent hacking or breaches of information or data streamed to and from the visor. It will of course be realized that while the foregoing has been given by way of illustrative example of this invention and the best method of its utility known to and fully described by the inventor, all such further and other modifications and variations thereto as would be apparent to persons skilled in the art are deemed to fall within the broad scope and ambit of this invention as herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

It will also be understood that references to integers or elements defined in the singular will likewise also apply in reference to their plural case and vice versa.

The invention claimed is:

1. An intelligent full-face, heads-up display helmet visor, the visor comprising:
   a surface adapted for a visual heads-up display function;
   a projector for the heads-up display function;

a microprocessor to control the projector and information projected on the surface;

a left audio speaker in communication with the microprocessor and positioned proximal to a user's left ear when in use;

a right audio speaker in communication with the microprocessor and positioned proximal to a user's right ear when in use;

the microprocessor being further adapted to transmit and receive positional information to and from a command computer and other microprocessors in a communications network; and wherein in operation, changes to the positions of personnel and the equipment within the communications network are virtually represented as digitized two-dimensional moving icons or symbols which are projected onto the surface without interfering with the field of vision viewed through the visor;

the microprocessor further containing instructions for:

transmitting positions of personnel wearing helmets with said visors and any equipment associated with the other microprocessors to the command computer;

receiving, from the command computer, locations of landmines located within a predetermined area;

upon receiving the location of at least one landmine within a predetermined distance from the user, transmitting a left audible warning to the left audio speaker and a right audible warning to the right audio speaker; and wherein the left and right audible warnings indicate an approximate direction and distance to the at least one landmine by applying at least one of a stereophonic difference and volume difference to the left audible warning relative to the right audible warning.

2. The visor of claim 1 wherein the projector is a laser scanning projector which projects the icons or symbols on the surface in a plain, multiple colors or flashing mode.

3. The visor of claim 1 wherein the visor has attachment means including lugs or bosses or fitment points specially configured to enable the visor to be retrofitted to helmets.

4. The visor of claim 1 wherein the visor has a smart or intelligent biometric identification facility including recognition of iris or retinal scanning or voice recognition to facilitate secure or password access to the command computer.

5. The visor of claim 1 wherein the visor is completely retractable into the shell of the helmet.

6. The visor of claim 1 wherein the heads-up display is projected on substantially the whole area of the visor.

7. The visor of claim 1 wherein the heads-up display is projected on a portion of the visor in front of a wearer's eye.

8. The visor of claim 1 wherein the microprocessor is continually or periodically updated by the command computer of troop positions during operational maneuvers to be visually displayed on every combatant's visor.

9. The visor of claim 1 wherein the microprocessor is able to receive and process alphanumeric information received from the command computer.

10. The visor of claim 1 wherein the microprocessor is provided information by the command computer of positions of injured personnel within a predetermined area wherein their rescue and evacuation can be effectively coordinated through visual representations displayed on the visor.

11. The visor of claim 1 wherein the microprocessor is provided information by the command computer relating to the physical condition of injured or isolated combatants which is communicated through alphanumeric information and visual representations displayed on the visor.

12. The visor of claim 1 wherein the microprocessor receives information from the command computer of data from biometric sensors monitoring the physical condition of combatants including galvanic skin response, heart rate and respiratory rate.

13. The visor of claim 1 wherein the microprocessor has a communications module to connect with other microprocessors of other visors which uses a Bluetooth wireless or equivalent communication protocol depending on the location or applicable environment to comprise the communications network.

14. The visor of claim 1 wherein representations of the landmines are displayed on the visor.

15. The visor of claim 1 wherein the visor includes an in built microphone in connection with the microprocessor to respond to voice activated instructions.

16. The visor of claim 1 wherein the visor includes access for, or integration of breathing apparatus in a hazardous chemical environment or warfare application.

17. The visor of claim 1 wherein the microprocessor and the command computer utilize quantum technology cyber security encryption to eliminate or prevent cyber-hacking or breaches of information or data within the communications network.

18. A head protection system, comprising: a helmet, and an intelligent full-face, heads-up display helmet visor, coupled to the helmet, the visor comprising:

a surface adapted for a visual heads-up display function;

a projector for the heads-up display function;

a microprocessor to control the projector and information projected on the surface;

a left audio speaker in communication with the microprocessor and positioned within a left side of the helmet;

a right audio speaker in communication with the microprocessor and positioned within a right side of the helmet;

the microprocessor being further adapted to transmit and receive positional information to and from a command computer and other microprocessors in a communications network;

wherein in operation, positions of personnel wearing helmets with communications network are virtually represented as digitized two dimensional moving icons or symbols which are projected onto the surface without interfering with the field of vision viewed through the visor;

the microprocessor further containing instructions for:

receiving, from the command computer, locations of landmines located within a predetermined area;

upon receiving the location of at least one landmine within a predetermined distance from the user, transmitting a left audible warning to the left audio speaker and a right audible warning to the right audio speaker; and wherein the left and right audible warnings indicate an approximate direction and distance to the at least one landmine by applying at least one of a stereophonic difference and volume difference to the left audible warning relative to the right audible warning.

19. The system of claim 18 wherein the helmet is a military or combat helmet.

20. The system of claim 18 wherein the helmet is a police, fire fighting, construction or mining helmet.

21. The visor of claim 1, wherein the surface, upon which changes to the positions of personnel and the equipment within the communications network are virtually represented as digitized two-dimensional moving icons or symbols by being projected thereupon, is formed as an eyepatch heads up display;
further wherein the eyepatch heads up display is arranged to, when the helmet comprising the visor is worn by the personnel, be positioned in front of only one of the personnel's eyes, without occluding or restricting the personnel's other eye.

* * * * *